US008718017B2

(12) United States Patent
Chin et al.

(10) Patent No.: US 8,718,017 B2
(45) Date of Patent: May 6, 2014

(54) CONFIRMATION OF BASE STATION IDENTIFICATION TO IMPROVE HANDOVER

(75) Inventors: Tom Chin, San Diego, CA (US); Ming Yang, San Diego, CA (US); Qingxin Chen, Del Mar, CA (US); Guangming Shi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 25 days.

(21) Appl. No.: 13/612,462

(22) Filed: Sep. 12, 2012

(65) Prior Publication Data

US 2014/0071938 A1 Mar. 13, 2014

(51) Int. Cl.

*H04W 4/00* (2009.01)
*H04W 80/04* (2009.01)
*H04W 36/30* (2009.01)
*H04W 84/12* (2009.01)

(52) U.S. Cl.

CPC .............. *H04W 80/04* (2013.01); *H04W 36/30* (2013.01); *H04W 84/12* (2013.01)
USPC ........................................... 370/331; 370/332

(58) Field of Classification Search

CPC ...... H04W 80/04; H04W 36/30; H04W 84/12
USPC .............. 370/310.2, 319, 328, 338, 331, 332, 370/344, 349; 455/436, 439, 442, 444
See application file for complete search history.

(56) References Cited

U.S. PATENT DOCUMENTS

| | | | | |
|---|---|---|---|---|
| 6,256,494 | B1 * | 7/2001 | Lopes et al. | 455/423 |
| 7,072,318 | B2 | 7/2006 | Shoji et al. | |
| 7,313,116 | B2 | 12/2007 | Lee et al. | |
| 7,843,886 | B2 * | 11/2010 | Johnson et al. | 370/332 |
| 8,582,530 | B2 * | 11/2013 | Binzel et al. | 370/331 |
| 2010/0142487 | A1 | 6/2010 | Kim | |

FOREIGN PATENT DOCUMENTS

CN 1988414 A 6/2007

* cited by examiner

*Primary Examiner* — Brenda H Pham
(74) *Attorney, Agent, or Firm* — Kristine U. Ekwueme

(57) ABSTRACT

A method of wireless communication is presented. The method includes receiving an operating frequency and base station identification code (BSIC) for a neighboring base station, determining an expected received signal based from the operating frequency and BSIC, comparing a received signal with the expected received signal, and reporting a result of the comparing.

24 Claims, 6 Drawing Sheets

CONFIRMATION OF BASE STATION IDENTIFICATION TO IMPROVE HANDOVER

BACKGROUND

1. Field

Aspects of the present disclosure relate generally to wireless communication systems, and more particularly, to confirming base station identification prior to a handover in a TD-SCDMA network.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Packet Access (HSPA), which provides higher data transfer speeds and capacity to associated UMTS networks. HSPA is a collection of two mobile telephony protocols, High Speed Downlink Packet Access (HSDPA) and High Speed Uplink Packet Access (HSUPA), that extends and improves the performance of existing wideband protocols.

As the demand for mobile broadband access continues to increase, research and development continue to advance the UMTS technologies not only to meet the growing demand for mobile broadband access, but to advance and enhance the user experience with mobile communications.

SUMMARY

According to an aspect, a method of wireless communication is presented. The method includes receiving an operating frequency and base station identification code (BSIC) for a neighboring base station. The method also includes determining an expected received signal based from the operating frequency and BSIC. The method further includes comparing a received signal with the expected received signal. The method still further includes reporting a result of the comparing.

According to another aspect, an apparatus for wireless communication is presented. The apparatus includes means for receiving an operating frequency and BSIC for a neighboring base station. The apparatus also includes means for determining an expected received signal based from the operating frequency and BSIC. The apparatus further includes means for comparing a received signal with the expected received signal. The apparatus still further includes means for reporting a result of the comparing.

According to yet another aspect a computer program product for wireless communication in a wireless network. The computer program product includes a non-transitory computer-readable medium having non-transitory program code recorded thereon. The program code includes program code to receive an operating frequency and BSIC for a neighboring base station. The program code also includes program code to determine an expected received signal based from the operating frequency and BSIC. The program code further includes program code to compare a received signal with the expected received signal. The program code still further includes program code to report a result of the comparing.

According to still yet another aspect, an apparatus for wireless communication is presented. The apparatus includes a memory and a processor(s) coupled to the memory. The processor being configured to receive an operating frequency and BSIC for a neighboring base station. The processor is also configured to determine an expected received signal based from the operating frequency and BSIC. The processor is further configured to compare a received signal with the expected received signal. The processor is still further configured to report a result of the comparing.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
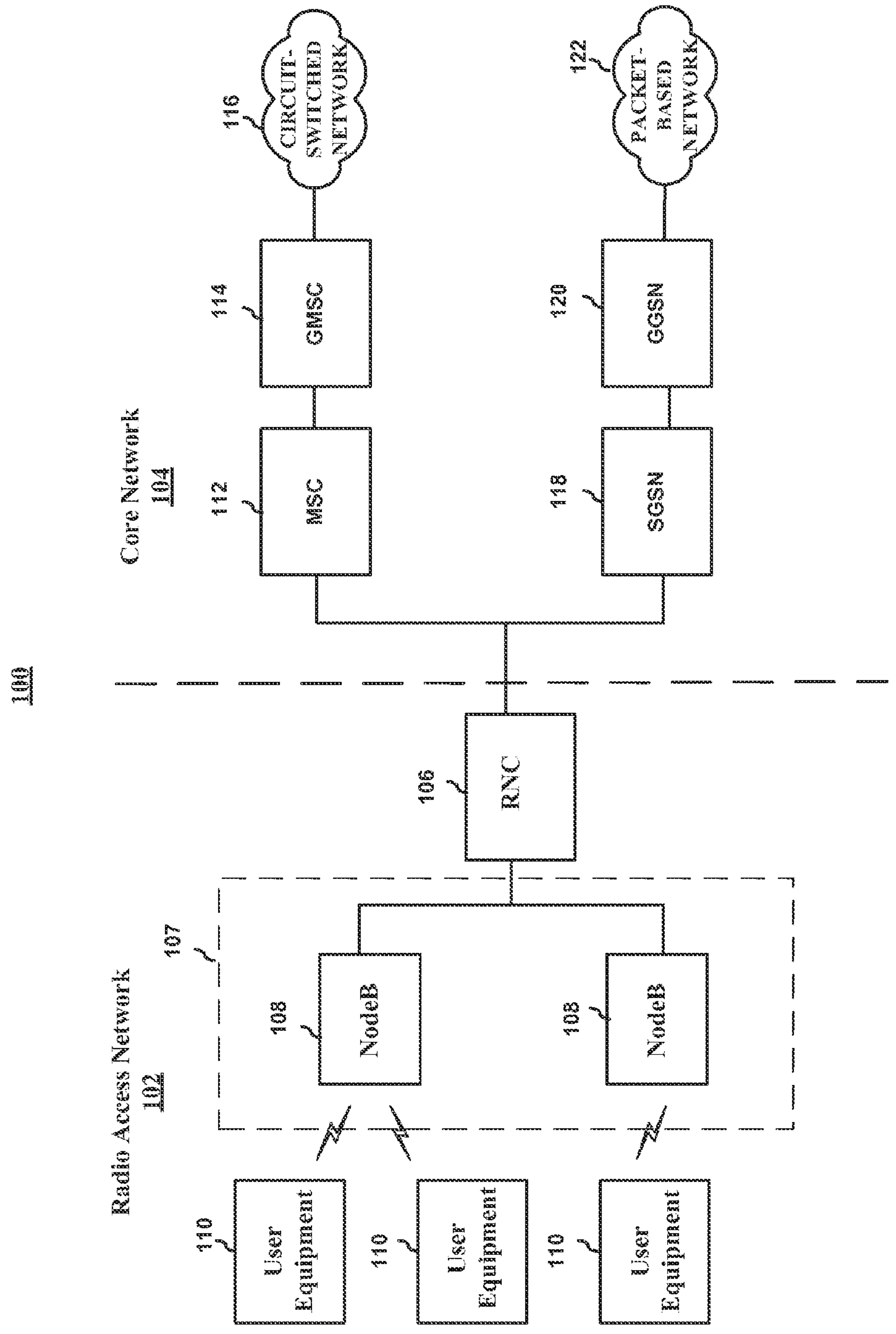
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two node Bs 108 are shown; however, the RNS 107 may include any number of wireless node Bs. The node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the node Bs 108. The downlink (DL), also called the forward link, refers to the communication link from a node B to a UE, and the uplink (UL), also called the reverse link, refers to the communication link from a UE to a node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a node B 108 and a UE 110, but divides uplink and downlink transmissions into different time slots in the carrier.

Figure 2:
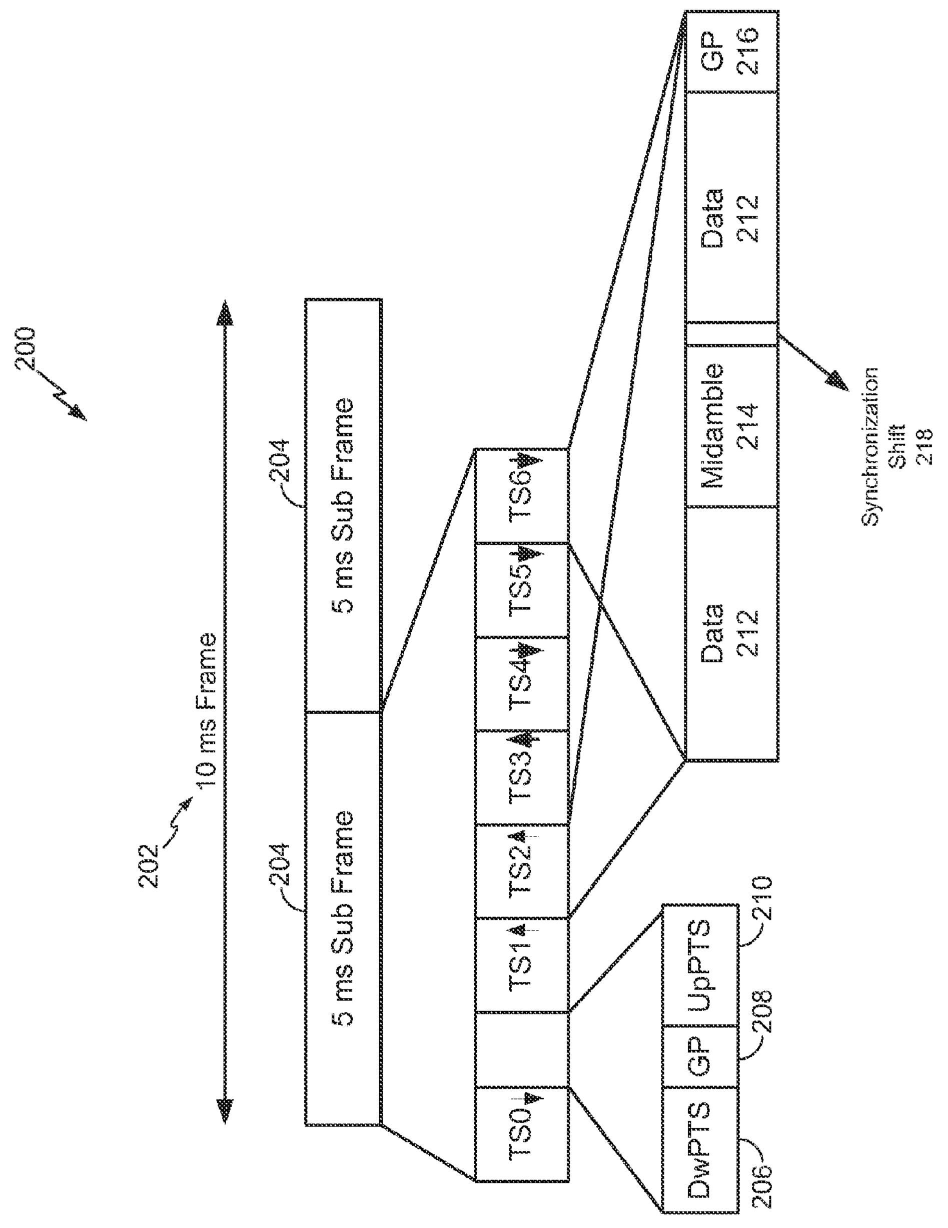
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The chip rate in TD-SCDMA is 1.28 Mcps. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 (each with a length of 352 chips) separated by a midamble 214 (with a length of 144 chips) and followed by a guard period (GP) 216 (with a length of 16 chips). The midamble 214 may be used for features, such as channel estimation, while the guard period 216 may be used to avoid inter-burst interference. Also transmitted in the data portion is some Layer 1 control information, including Synchronization Shift (SS) bits 218. Synchronization Shift bits 218 only appear in the second part of the data portion. The Synchronization Shift bits 218 immediately following the midamble can indicate three cases: decrease shift, increase shift, or do nothing in the upload transmit timing. The positions of the SS bits 218 are not generally used during uplink communications.

Figure 3:
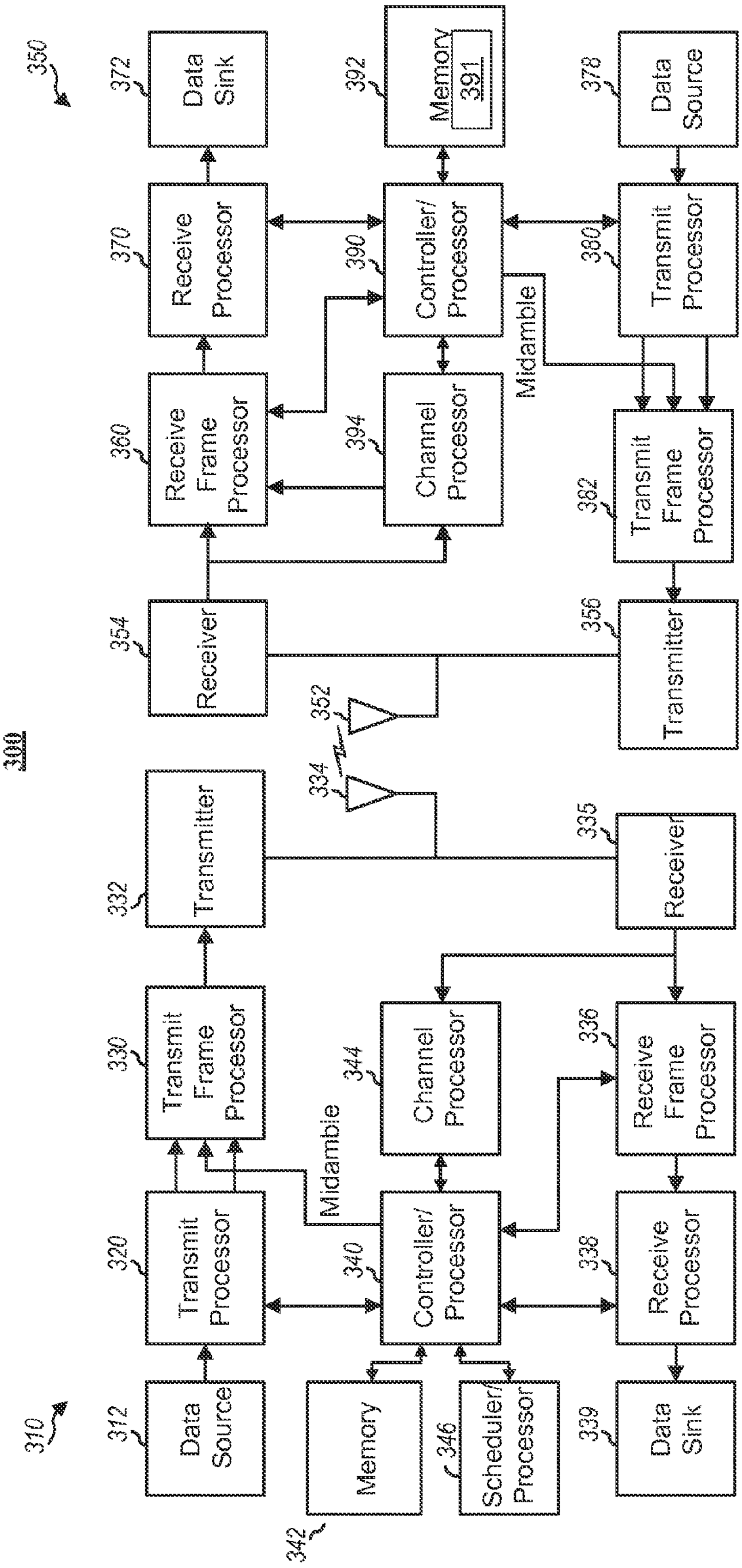
FIG. 3 is a block diagram conceptually illustrating an example of a node B in communication with a UE in a telecommunications system.

FIG. 3 is a block diagram of a node B 310 in communication with a UE 350 in a RAN 300, where the RAN 300 may be the RAN 102 in FIG. 1, the node B 310 may be the node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the node B 310. More specifically, the receive processor 370 descrambles and despreads the symbols, and then determines the most likely signal constellation points transmitted by the node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the node B 310 or from feedback contained in the midamble transmitted by the node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the node B 310 and the UE 350, respectively. For example, the memory 392 of the UE 350 may store a base station identity code identification module 391 which, when executed by the controller/processor 390, configures the UE 350 for determining an expected synchronization channel code word based on the operating frequency and base station identification code of a base station. A scheduler/processor 346 at the node B 310 may be used to allocate resources to the UEs and schedule downlink and/or uplink transmissions for the UEs.

Confirmation of Base Station Identification to Improve Handover

A potential inter-RAT handover may specify for a UE to perform measurements to confirm and re-confirm the identification code of a neighboring base station. In a multi-RAT capable user equipment (UE), when a UE is performing inter-RAT measurements for a potential inter-RAT handover, a single receiver UE may not have sufficient idle time slots to confirm and re-confirm the identification code of a neighboring base station. For example, when performing inter-RAT measurements for a TD-SCDMA to GSM handover, the UE may not have sufficient idle time slots to confirm and re-confirm the identification code of a neighboring GSM base station. It should be noted that in the present disclosure a UE refers to a multi-RAT UE.

According to an aspect of the present disclosure, a UE may use the information from a neighbor base station list provided by a serving base station of a first RAT, such as a TD-SCDMA base station, to find a relationship between an operating frequency and a base station identification code (BSIC) of neighboring base stations of a second RAT, such as GSM base stations. In this aspect, the UE may use the relationship to determine an expected synchronization channel (SCH) code word. Moreover, the UE may receive a synchronization code word of a neighbor base station while performing inter-RAT measurements. After receiving the actual synchronization channel code word, the UE may compare the received synchronization channel code word with the expected synchronization channel code word. The UE may perform the measurement reporting specified for an inter-RAT handover if the results of the comparison are above a threshold.

According to an aspect of the present disclosure, the UE may use a reduced number of idle time slots for decoding a base station identification code by comparing an actual received code word to the expected code word. The reduced number of idle time slots may improve inter-RAT measurements prior to a handover. In a conventional system, the UE decodes the synchronization code word during idle time slots to obtain the base station identification code. In one aspect of the present disclosure, the UE does not decode the synchronization code word during idle time slots. Rather, the expected synchronization code word is determined from the relationship between an operating frequency and a base station identification code. The UE may determine that the decoding of the synchronization code word is successful when the correlation between the expected synchronization code word and the received synchronization code word is above a threshold.

In some cases, a UE may include sub-modules for each RAT. For example, a UE may include a TD-SCDMA sub-module and a GSM sub-module. When the UE is connected to a first RAT, such as TD-SCDMA, the first RAT sub-module may receive a neighbor base station list from the first RAT. The neighbor base station list includes a list of neighbor base stations of a second RAT, such as GSM. The neighbor base station list may also include the operating frequency (e.g., absolute radio frequency channel number (ARFCN)) and the base station identification code of each neighbor base station.

According to an aspect of the present disclosure, a first RAT sub-module may provide the information in the neighbor base station list to a second RAT sub-module. The second RAT sub-module may generate an expected synchronization channel code word based on the operating frequency and base station identification code of a specific neighbor base station. Furthermore, the UE (e.g., second RAT sub-module) may perform inter-RAT measurements of the specific neighbor base station and receive an actual synchronization channel code word. The UE may then correlate the received synchronization channel code word with the expected synchronization channel code word to determine whether the synchronization channel decoding is successful.

Specifically, the UE determines whether the correlation of the received synchronization channel code word with the expected synchronization channel code word is above or below a threshold. More specifically, the UE may determine that the synchronization channel decoding was successful and may report, to the first RAT sub-module, that the neighbor base station identification code was verified if the correlation is above a threshold. Furthermore, the UE may determine that the synchronization channel decoding failed and may report, to the first RAT sub-module, that the neighbor base station identification code was not verified if the correlation is below a threshold.

Figure 4:
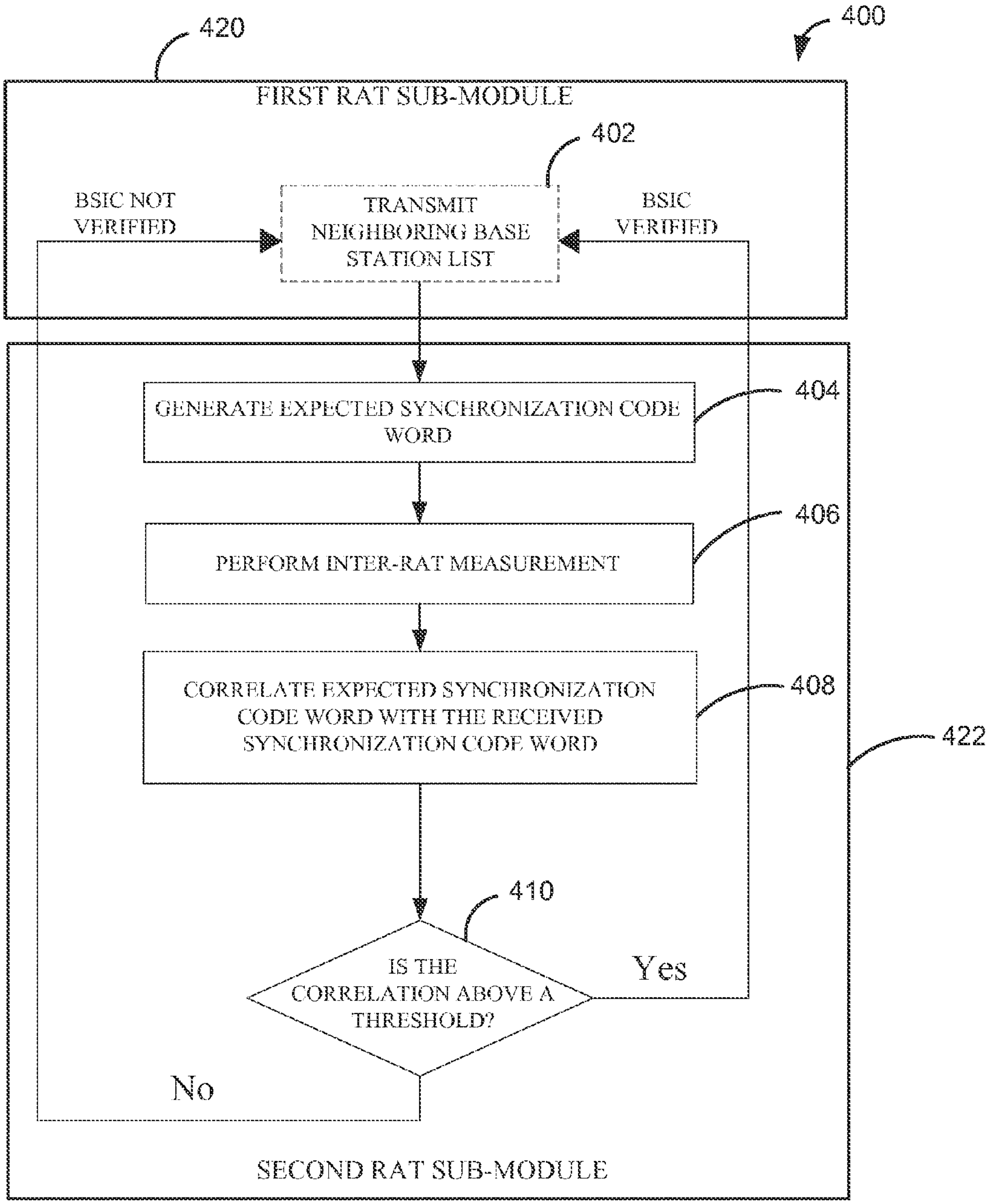
FIG. 4 is a block diagram illustrating a method for verifying a neighbor base station identification code in a multi-RAT UE according to an aspect of the present disclosure.

FIG. 4 is block diagram illustrating verifying a neighbor base station identification code in a UE 400 according to an aspect of the present disclosure. As shown in FIG. 4, the UE 400 may include a first RAT sub-module 420 and a second RAT sub-module 422. The first RAT sub-module 420 may receive a neighbor base station list from the first RAT and may transmit the received neighbor base station list to the second RAT sub-module 422, as shown in block 402. The neighbor base station list may include a list of neighbor base stations of the second RAT. The neighbor base station list may also include the operating frequency and the base station identification code of each base station of the second RAT. The second RAT sub-module 422 may generate an expected synchronization code word based on a relationship between the operating frequency and base station identification code of a specific base station of the second RAT, as shown in block 404. It should be noted that according to aspects of the present disclosure, the second RAT sub-module 422 may generate an expected synchronization code for each base station on the neighboring base station list or specific base stations on the neighboring base station list.

Additionally, the second RAT sub-module 422 may perform inter-RAT measurements for a base station of the second RAT, as shown in block 406. After performing inter-RAT measurements of a base station of the second RAT (block 406), the second RAT sub-module 422 may correlate the expected synchronization code word with a received synchronization code word of the base station of the second RAT, as shown in block 408. The UE may then determine if the correlation is above or below a threshold, as shown in block 410. Finally, the UE may inform the first RAT sub-module 420 if the base station identification code was verified or not verified based on the correlation. That is, if the correlation is above a threshold, the base station identification code is verified and the synchronization channel decoding is deemed successful. Alternatively, if the correlation is less than a threshold, the base station identification code is not verified and the synchronization channel decoding is deemed unsuccessful.

Aspects of the present disclosure improve the success rate for the synchronization channel decoding, reduce the probability of base station identification code identification/re-confirmation failure, and also reduce the latency of the synchronization channel decoding procedure. That is, the aspects of the present disclosure improve the success rate of an inter-RAT handover.

Figure 5:
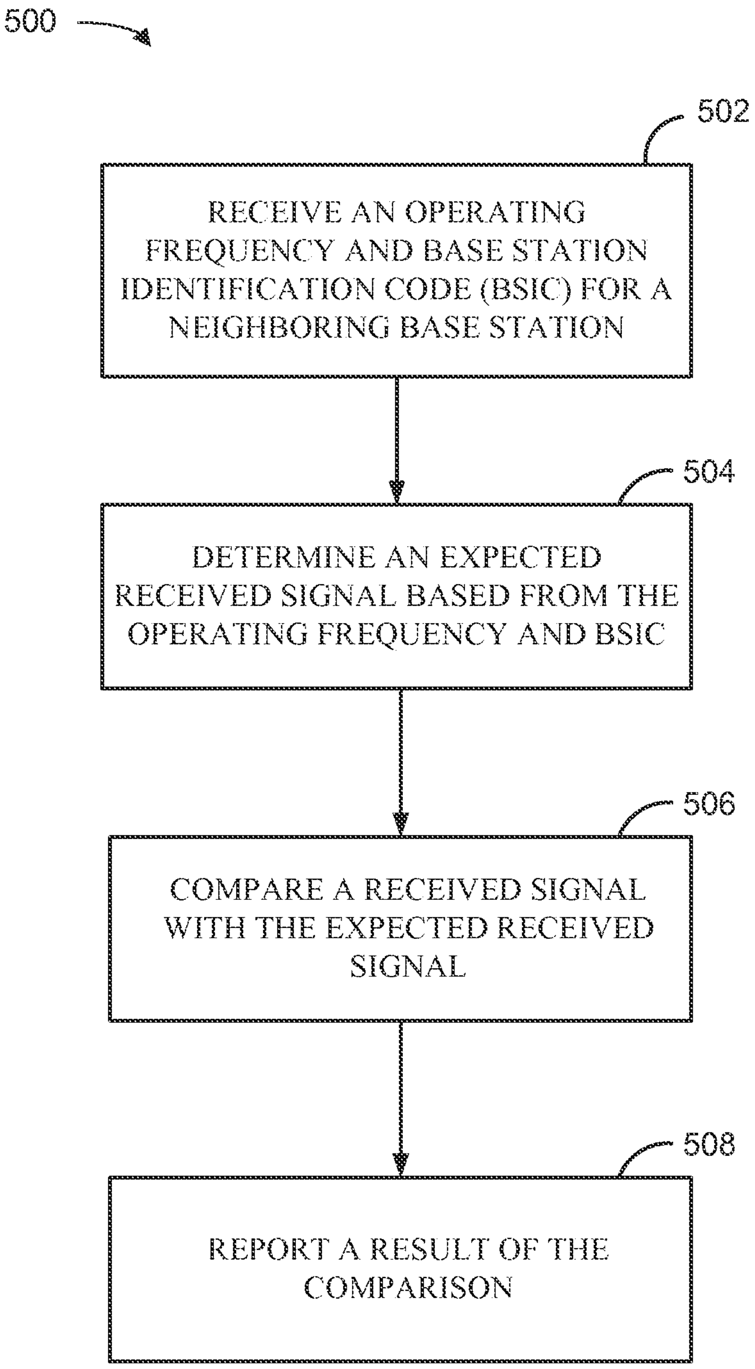
FIG. 5 is a block diagram illustrating a method for confirming a base station identification code according to an aspect of the present disclosure.

FIG. 5 shows a wireless communication method 500 according to one aspect of the disclosure. A UE receives an operating frequency and base station identification code (BSIC) for a neighboring base station as shown in block 502. The UE also determines an expected received signal based from the operating frequency and BSIC, as shown in block 504. Furthermore, the UE compares a received signal with the expected received signal, as shown in bock 506. Finally, the UE reports a result of the comparison, as shown in block 508.

Figure 6:
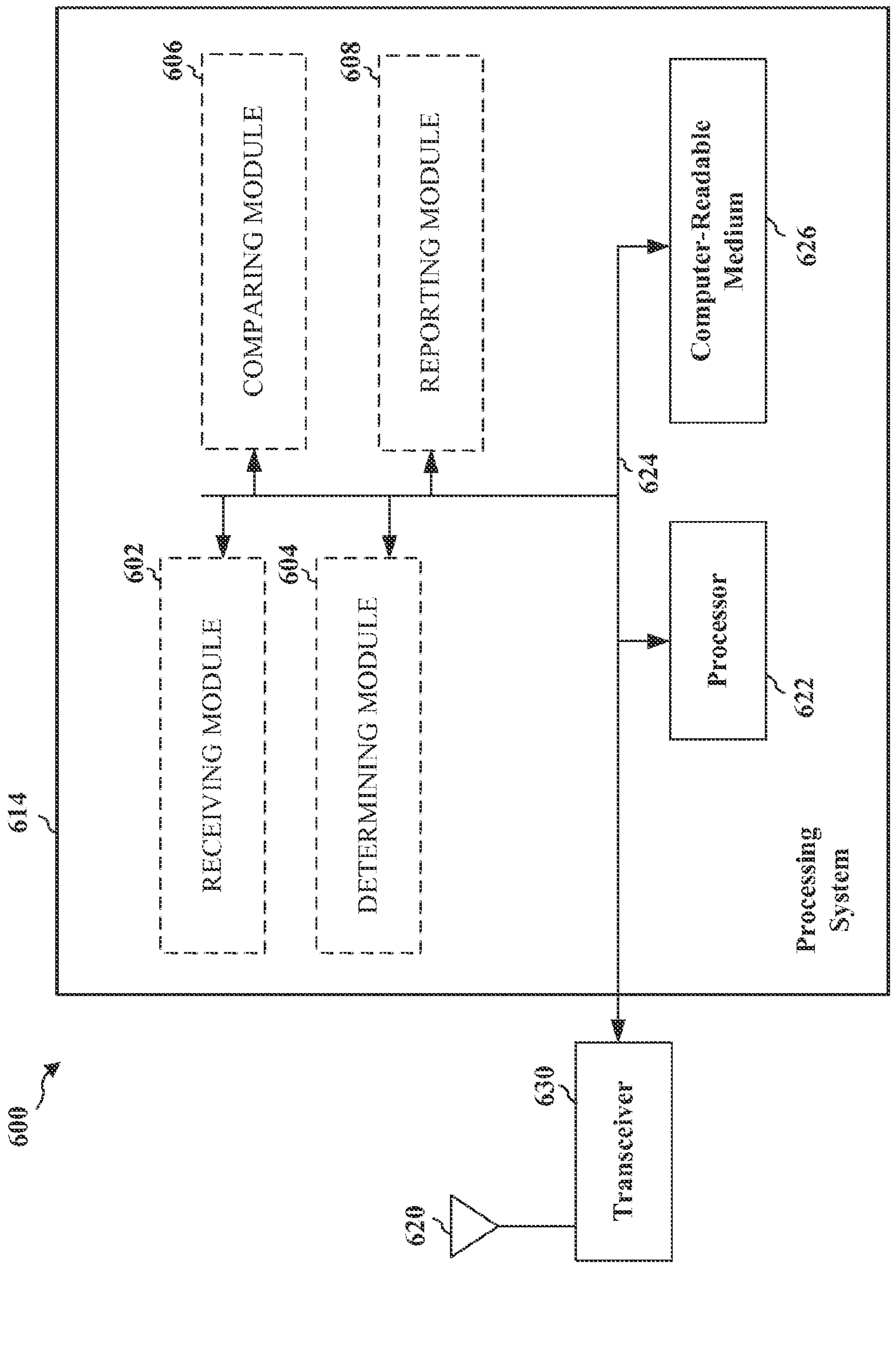
FIG. 6 is a diagram illustrating an example of a hardware implementation for an apparatus employing a processing system according to one aspect of the present disclosure.

FIG. 6 is a diagram illustrating an example of a hardware implementation for an apparatus 600 employing a processing system 614. The processing system 614 may be implemented with a bus architecture, represented generally by the bus 624. The bus 624 may include any number of interconnecting buses and bridges depending on the specific application of the processing system 614 and the overall design constraints. The bus 624 links together various circuits including one or more processors and/or hardware modules, represented by the processor 622 the modules 602, 604, 606, 608, and the computer-readable medium 626. The bus 624 may also link various other circuits such as timing sources, peripherals, voltage regulators, and power management circuits, which are well known in the art, and therefore, will not be described any further.

The apparatus includes a processing system 614 coupled to a transceiver 630. The transceiver 630 is coupled to one or more antennas 620. The transceiver 630 enables communicating with various other apparatus over a transmission medium. The processing system 614 includes a processor 622 coupled to a computer-readable medium 626. The processor 622 is responsible for general processing, including the execution of software stored on the computer-readable medium 626. The software, when executed by the processor 622, causes the processing system 614 to perform the various functions described for any particular apparatus. The computer-readable medium 626 may also be used for storing data that is manipulated by the processor 622 when executing software.

The processing system 614 includes a receiving module 602 for receiving an operating frequency and base station identification code (BSIC) for a neighboring base station. The processing system 614 includes a determining module 604 for determining an expected received signal based from the operating frequency and BSIC. The processing system 614 also includes a comparing module 606 for comparing a received signal with the expected signal. The processing system 614 further includes a reporting module 608 for reporting as result of the comparing. The modules may be software modules running in the processor 622, resident/stored in the computer-readable medium 626, one or more hardware modules coupled to the processor 622, or some combination thereof. The processing system 614 may be a component of the UE 350 and may include the memory 392, and/or the controller/processor 390.

In one configuration, an apparatus such as a UE is configured for wireless communication including means for receiving, means for determining, means for comparing, and means for reporting. In one aspect, the above means may be the antennas 352, the receiver 354, the channel processor 394, the receive frame processor 360, the receive processor 370, the transmitter 356, the transmit frame processor 382, the transmit processor 380, the controller/processor 390, the memory 392, synchronization channel code word estimation module 391, receiving module 602, determining module 604, comparing module 606, reporting module 608, and/or the processing system 614 configured to perform the functions recited by the aforementioned means. In another aspect, the aforementioned means may be a module or any apparatus configured to perform the functions recited by the aforementioned means.

Several aspects of a telecommunications system has been presented with reference to TD-SCDMA systems. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
receiving an indication of an operating frequency and base station identification code (BSIC) for a neighboring base station;
determining an expected received signal based on the operating frequency and BSIC;
comparing a received signal with the expected received signal; and
reporting a result of the comparing.

2. The method of claim 1, in which:
the expected received signal is an expected synchronization channel (SCH) code word; and
the received signal is a received SCH code word.

3. The method of claim 2, in which the comparing comprises correlating the expected SCH code word with the received SCH code word.

4. The method of claim 1, in which the reporting comprises reporting a verified BSIC to a sub-module of a connected RAT when the result of the comparing is above a threshold.

5. The method of claim 1, in which the operating frequency and BSIC are received in a neighboring base station list.

6. The method of claim 1, further comprising confirming an identity of a base station sending the received signal using the BSIC.

7. An apparatus for wireless communication, comprising:
means for receiving an indication of an operating frequency and base station identification code (BSIC) for a neighboring base station;
means for determining an expected received signal based on the operating frequency and BSIC;
means for comparing a received signal with the expected received signal; and
means for reporting a result of the comparing.

8. The apparatus of claim 7, in which:
the expected received signal is an expected synchronization channel (SCH) code word; and
the received signal is a received SCH code word.

9. The apparatus of claim 8, in which the means for comparing comprises means for correlating the expected SCH code word with the received SCH code word.

10. The apparatus of claim 7, in which the means for reporting comprises means for reporting a verified BSIC to a sub-module of a connected RAT when the result of the comparing is above a threshold.

11. The apparatus of claim 7, in which the operating frequency and BSIC are received in a neighboring base station list.

12. The apparatus of claim 7, further comprising means for confirming an identity of a base station sending the received signal using the BSIC.

13. A computer program product for wireless communication in a wireless network, comprising:
a non-transitory computer-readable medium having non-transitory program codes recorded thereon, the program codes when executed by a computer cause the computer to perform:
receive an indication of an operating frequency and base station identification code (BSIC) for a neighboring base station;
determine an expected received signal based on the operating frequency and BSIC;
compare a received signal with the expected received signal; and
program code to report a result of the comparing.

14. The computer program product of claim 13, in which:
the expected received signal is an expected synchronization channel (SCH) code word; and
the received signal is a received SCH code word.

15. The computer program product of claim 14, in which the program code to compare comprises program code to correlate the expected SCH code word with the received SCH code word.

16. The computer program product of claim 13, in which the program code to report comprises program code to report a verified BSIC to a sub-module of a connected RAT when the result of the comparing is above a threshold.

17. The computer program product of claim 13, in which the operating frequency and BSIC are received in a neighboring base station list.

18. The computer program product of claim 13, further comprising program code to confirm an identity of a base station sending the received signal using the BSIC.

19. An apparatus for wireless communication, comprising:
a memory; and
at least one processor coupled to the memory, the at least one processor being configured:
to receive an indication of an operating frequency and base station identification code (BSIC) for a neighboring base station;
to determine an expected received signal based on the operating frequency and BSIC;

to compare a received signal with the expected received signal; and to report a result of the comparing.

20. The apparatus of claim 19, in which:

the expected received signal is an expected synchronization channel (SCH) code word; and the received signal is a received SCH code word.

21. The apparatus of claim 20, in which the at least one processor is further configured to correlate the expected SCH code word with the received SCH code word.

22. The apparatus of claim 19, in which the at least one processor is further configured to report a verified BSIC to a sub-module of a connected RAT when the result of the comparing is above a threshold.

23. The apparatus of claim 19, in which the operating frequency and BSIC are received in a neighboring base station list.

24. The apparatus of claim 19, in which the at least one processor is further configured to confirm an identity of a base station sending the received signal using the BSIC.

* * * * *